(No Model.)
B. WYBORNY.
TIRE TIGHTENER.
No. 555,994. Patented Mar. 10, 1896.
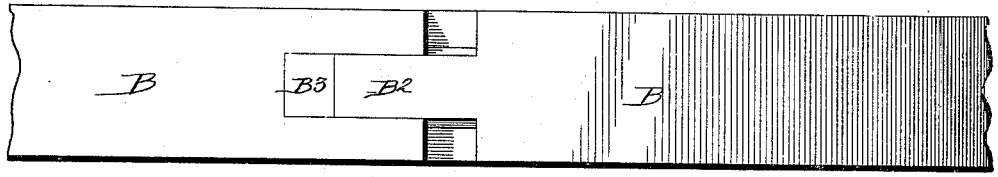
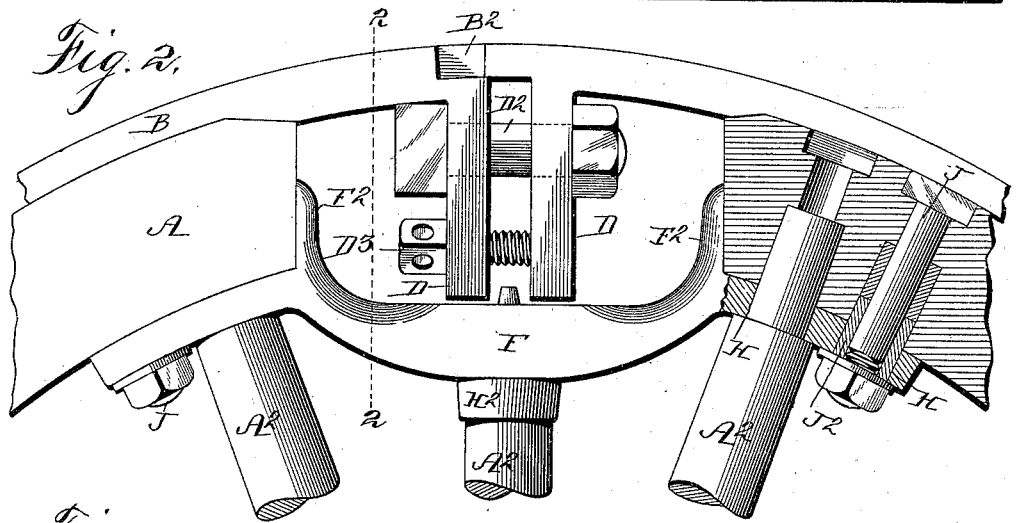
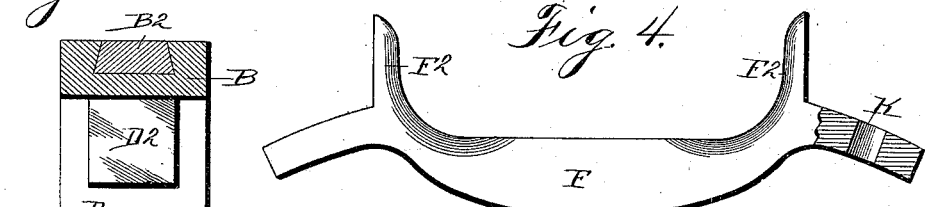
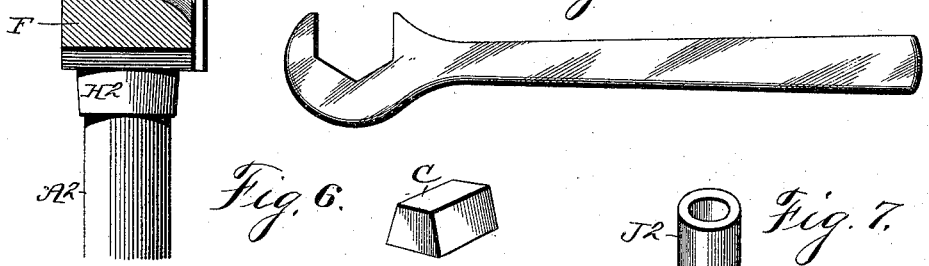

UNITED STATES PATENT OFFICE.

BRADICK WYBORNY, OF MANLY, IOWA.

TIRE-TIGHTENER.

SPECIFICATION forming part of Letters Patent No. 555,994, dated March 10, 1896.

Application filed May 27, 1895. Serial No. 550,893. (No model.)

*To all whom it may concern:*

Be it known that I, BRADICK WYBORNY, a citizen of the United States of America, residing at Manly, in the county of Worth and State of Iowa, have invented a new and useful Tire-Tightener, of which the following is a specification.

The object of this invention is to provide a strong, durable and easily-operated device for tightening a tire upon a wheel and to provide a device in which none of the parts project beyond the surface of the tire or felly.

My invention consists in the construction of the device for separating the ends of the felly and in the construction, arrangement and combination therewith of the means for adjusting the tire, as hereinafter set forth, pointed out in my claims, and illustrated in the accompanying drawings, in which—

Figure 1 is a top view of a section of a tire at the joint therein. Fig. 2 is a side elevation of the same, partly in section. Fig. 3 is a transverse section through the line 2 2 of Fig. 2. Fig. 4 is a side elevation of a modified form of the device for separating the felly. Fig. 5 is a plan of a wrench used in tightening the nuts. Fig. 6 is a detail perspective of one of the blocks used in filling up the openings in the tire. Fig. 7 is a like view of one of the bushings for the bolts.

Referring to the accompanying drawings, the reference-letter A is used to indicate the wooden felly, and $A^2$ the spokes, which are each of common construction.

B indicates the tire fitted to the felly and having the meeting ends provided with a tongue $B^2$ and a mating groove $B^3$. These parts are preferably dovetailed, so as to prevent an outward movement of the tongue, as clearly shown in Fig. 3.

When first placed on a wooden rim the ends of the tire are separated a slight distance, so as to allow for shrinkage of the felly, and the spaces thus formed are temporarily filled by the wedge-shaped blocks C.

Near the abutting ends of the tire are two integral inwardly-projecting lugs D connected at a point near their bases by the bolt $D^2$, one end of which is made angular to engage the inner surface of the tire to prevent the bolt from turning. To prevent the said bolt from drawing the ends of said lugs together I have provided a screw $D^3$, passed through a screw-threaded bore in one of the lugs and in engagement with the other.

F indicates a bracket for holding the abutting ends of the felly separated. It is arched in its central portion opposite from the curve of the wheel, and the shoulders $F^2$ on its end portions are adapted to rest on the ends of the felly and the ends of the bracket to overlap the ends of the felly. In each of their ends two like openings H are formed of a size designed to admit a spoke, and a socket $H^2$ is formed on the central portion of the bracket to admit a spoke. When the spokes in a wheel are close together, one is placed in the central socket and the adjoining ones in the inner openings H. They may be deflected slightly to permit this. When the spokes are separated by a greater distance, the one adjoining the one in the socket may be placed in the outer opening H. This bracket is secured to the felly by the bolts J, passed through the openings H not occupied by spokes and also through the felly. The bushings $J^2$ are placed in said openings to fill out the space around the bolt.

The modified form shown in Fig. 4 is adapted for wheels in which there is sufficient space between the spokes to admit the entire bracket, the openings K therein being just large enough to admit a bolt.

In practical use, assuming the tire to be in place on the wheel and that it is desired to compensate for shrinkage of the felly, the blocks C are first removed, (if blocks are used,) and the bolt $D^2$ tightened, thus bringing the ends of the tire together and clamping it firmly to the felly. If, however, the ends of the tire do not engage each other, a smaller block C is interposed, as it is necessary to protect the edges of the tire. The screw $D^3$ is loosened as necessary to retain the lugs in parallel planes.

Having thus described my invention, what I claim as new therein, and desire to secure by Letters Patent of the United States therefor, is—

1. A tire-tightener, comprising a bracket designed to engage the adjoining ends of a felly and hold them separated, a tire fitted to the felly and having a coacting, dovetailed tongue and groove on its abutting ends, wedge-shaped blocks to fill the spaces between the ends of the tire when separated, inwardly-projecting lugs formed in the ends of the tire, a bolt passed through said lugs, and a set-screw seated in one lug and in engagement with the other, for the purposes stated.

2. A tire-tightener, comprising a bracket designed to engage the adjoining ends of a felly and hold them separated, a socket on the central portion of the bracket and two holes in each end of the bracket to admit spokes, bolts passed through the remaining openings into the felly, bushings around the bolts, a tire having a coacting, dovetailed tongue and groove on its ends, integral lugs projecting inwardly from the ends, a bolt passed through the lugs and a set-screw seated in one lug and in engagement with the other, substantially as and for the purposes stated.

BRADICK WYBORNY.

Witnesses:
FRANK CHLUPACH,
JOSEPH RYCHLIK.